United States Patent
Tipley

[19]

[11] Patent Number: 5,872,982
[45] Date of Patent: Feb. 16, 1999

[54] REDUCING THE ELAPSED TIME PERIOD BETWEEN AN INTERRUPT ACKNOWLEDGE AND AN INTERRUPT VECTOR

[75] Inventor: Roger E. Tipley, Houston, Tex.

[73] Assignee: Compaq Computer Corporation, Houston, Tex.

[21] Appl. No.: 688,555

[22] Filed: Jul. 30, 1996

Related U.S. Application Data

[63] Continuation of Ser. No. 364,695, Dec. 28, 1994, abandoned.

[51] Int. Cl.⁶ ........................................... G06F 13/24
[52] U.S. Cl. .................... 395/728; 395/733; 395/736; 395/868
[58] Field of Search .................... 395/728, 733, 395/737, 742, 736, 734, 859, 868

[56] References Cited

U.S. PATENT DOCUMENTS

| | | | |
|---|---|---|---|
| 4,023,143 | 5/1977 | Braunstein ............................ | 395/736 |
| 4,271,468 | 6/1981 | Christensen et al. .................. | 395/859 |
| 4,604,500 | 8/1986 | Brown et al. .......................... | 379/269 |
| 5,067,071 | 11/1991 | Schanin et al. ....................... | 395/293 |
| 5,101,492 | 3/1992 | Schultz et al. . | |
| 5,101,497 | 3/1992 | Culley et al. ......................... | 395/734 |
| 5,129,064 | 7/1992 | Fogg, Jr. et al. ...................... | 395/500 |
| 5,283,904 | 2/1994 | Carson et al. ......................... | 395/739 |
| 5,317,747 | 5/1994 | Mochida et al. ....................... | 395/733 |
| 5,381,541 | 1/1995 | Kennedy et al. ...................... | 395/500 |
| 5,392,407 | 2/1995 | Heil et al. .............................. | 395/293 |
| 5,446,910 | 8/1995 | Kennedy et al. ...................... | 395/800 |

OTHER PUBLICATIONS

Intel Corp., "82374EB/SB EISA System Component (ESC)," pp. 11–35, 151–168, 179 (Aug. 1994).
Intel Corp., "82375EB/SB PCI–EISA Bridge (PCEB)," pp. 8–26, 75–76, 96, 119 (Aug. 1994).

Primary Examiner—Ayaz R. Sheikh
Assistant Examiner—Ario Etienne
Attorney, Agent, or Firm—Fish & Richardson P.C.

[57] ABSTRACT

In general, in one aspect, the invention features a method for reducing the elapsed period between the time an interrupt acknowledge is issued by a CPU and the time when the corresponding interrupt vector is received at the CPU. When a device connected to a lower speed bus sends an interrupt request, an interrupt queue device, connected to the CPU by a higher speed bus, intercepts the interrupt request, temporarily stores the corresponding interrupt vector and then responds to an interrupt acknowledge from the CPU by delivering the temporarily stored interrupt vector on the higher speed bus. In addition, the interrupt queue can deliver the temporarily stored interrupt vector to the CPU on a separate serial line.

43 Claims, 8 Drawing Sheets

REDUCING THE ELAPSED TIME PERIOD BETWEEN AN INTERRUPT ACKNOWLEDGE AND AN INTERRUPT VECTOR

This application is a file wrapper continuation of U.S. application Ser. No. 08/364,695, filed Dec. 28, 1994, now abandoned.

BACKGROUND

This invention relates to interrupt schemes.

Hardware interrupts in Intel-based personal computers, for example, typically force the central processing unit (CPU) to wait while the hardware interrupt controller provides the CPU a complete interrupt vector. Once received, the CPU uses the interrupt vector to address an interrupt handling routine. The waiting period, known as "acknowledge latency," stems from the fact that interrupt controllers generally connect to an input/output (I/O) bus of the microcomputer, and the I/O bus has a much longer access time than the local CPU bus. After the CPU receives notification of an interrupt, and acknowledges this to the interrupt controller, the CPU must wait (without performing other operations) typically 1–2 μsec before it receives the interrupt vector from the interrupt controller. Depending on the speed of the CPU, the acknowledge latency can be as many as 100 CPU clock cycles.

SUMMARY

In general, in one aspect, the invention features a method for reducing the elapsed period between the time an interrupt acknowledge is issued by a CPU and the time when the corresponding interrupt vector is received at the CPU. When a device connected to a lower speed bus sends an interrupt request, an interrupt queue device, connected to the CPU by a higher speed bus, intercepts the interrupt request, temporarily stores the corresponding interrupt vector, forwards the interrupt request to the CPU, and then responds to an interrupt acknowledge from the CPU by delivering the temporarily stored interrupt vector on the higher speed bus.

Implementations of the invention may include the following features. The first device can be an interrupt controller connected to an ISA, EISA or MCA, or other lower speed bus, and in particular can be one of the Intel 8259 family of interrupt controllers. The CPU can be one of the Intel 8086 family of microprocessors or a compatible equivalent. The interrupt queue can include a register for temporarily storing the corresponding interrupt vector. The interrupt queue can send an interrupt acknowledge to the first device, and then send an interrupt request to the CPU after first temporarily storing the corresponding interrupt vector. Once the interrupt vector has been sent to the CPU, the CPU can send an interrupt clearing signal to the first device and to the interrupt queue. Furthermore, the interrupt queue can temporarily store more than one interrupt vector at a time, or different types of interrupt vectors. Also, the interrupt queue can deliver the temporarily stored interrupt vector to the CPU on a separate serial line.

In general, in another aspect, the invention features apparatus for reducing the elapsed period between the time an interrupt acknowledge is issued by a CPU and the time when the corresponding interrupt vector is received at the CPU. A first device connected to a lower speed bus sends an interrupt request to an interrupt queue, which intercepts the interrupt request and temporarily stores the corresponding interrupt vector from the first device. The interrupt queue connects to the lower speed bus and to a higher speed bus more closely associated with the CPU. When the CPU generates an interrupt acknowledge, the interrupt queue can respond by delivering the temporarily stored interrupt vector on the higher speed bus.

Implementations of the invention may include the following features. The first device can be an interrupt controller connected to an ISA, EISA or MCA, or other lower speed bus, and in particular can be one of the Intel 8259 family of interrupt controllers. The CPU can be one of the Intel 8086 family of microprocessors or a compatible equivalent. The interrupt queue can include a register for temporarily storing the corresponding interrupt vector. The interrupt queue can send an interrupt acknowledge to the first device, and then send an interrupt request to the CPU after first temporarily storing the corresponding interrupt vector. Once the interrupt vector has been sent to the CPU, the CPU can send an interrupt clearing signal to the first device and to the interrupt queue. Furthermore, the interrupt queue can temporarily store more than one interrupt vector at a time, or different types of interrupt vectors. Also, the interrupt queue can deliver the temporarily stored interrupt vector to the CPU on a separate serial line.

Among the advantages of the invention are the following. Interrupt acknowledge latency at the CPU is reduced. The interrupt queue alerts the CPU to an interrupt only when the full interrupt vector has been temporarily stored by the interrupt queue and is ready for transfer. The interrupt queue can be easily implemented into conventional microprocessor systems, particularly Intel-based personal computers having ISA, EISA and/or MCA interrupt controllers. The interrupt queue can be adapted to handle ISA, EISA, MCA and PCI (and equivalent) type interrupts.

Other advantages and features of the invention will become apparent from the following description and from the claims.

DESCRIPTION

Figures 1, 2:
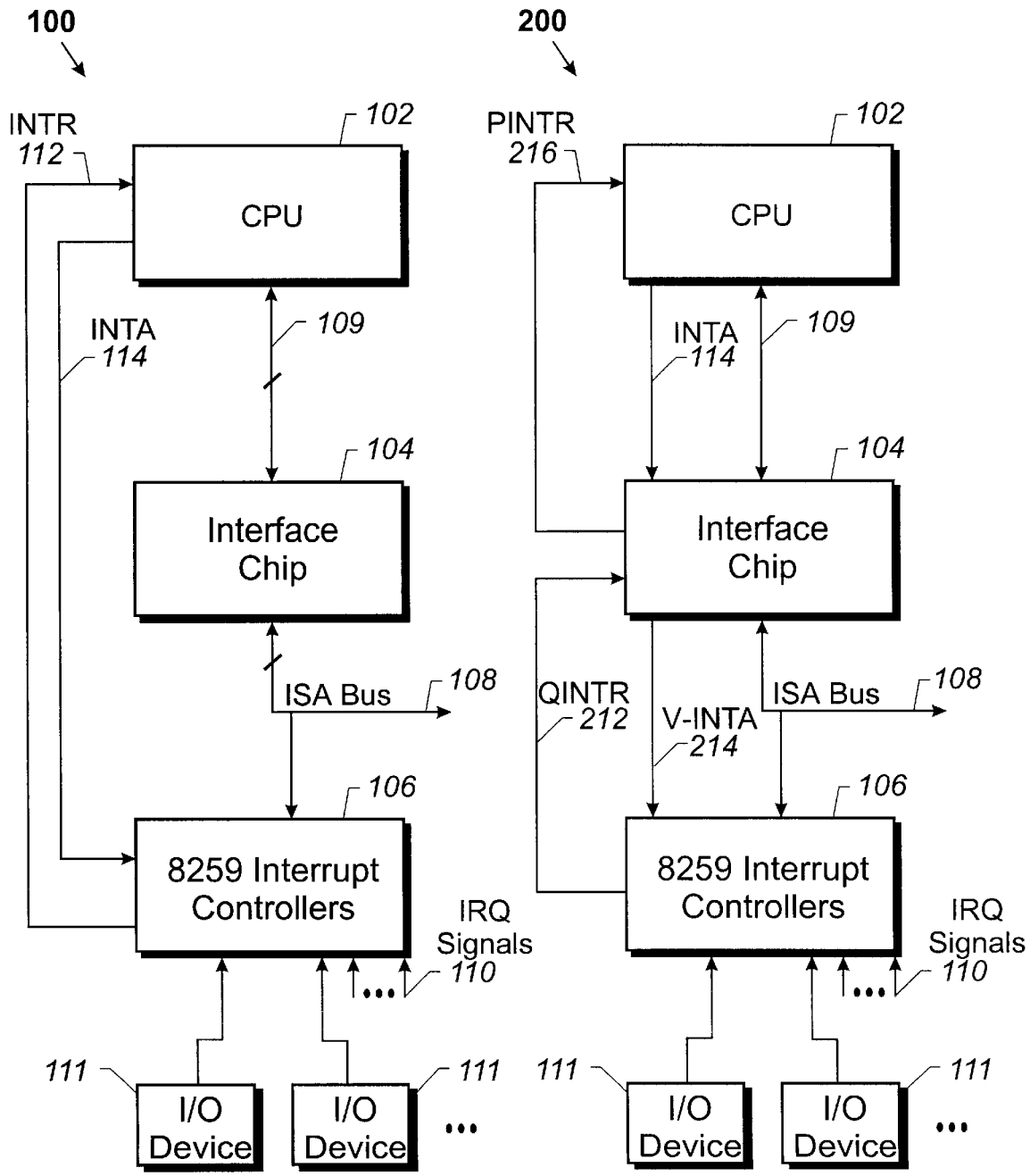
FIG. 1 is a schematic block diagram of a conventional hardware interrupt system.
FIG. 2 is a schematic block diagram of a hardware interrupt system having an interrupt queue.

Referring to FIG. 1, a conventional hardware interrupt system 100, for use with CPU's compatible with the Intel 8086 family of microprocessors, has a central processing unit (CPU) 102 (for example, one of the Intel-8086 family of microprocessors or a compatible equivalent, such as a 386, 486 or Pentium microprocessor) that connects, via an interface chip 104, to one or more 8259 family interrupt controllers 106. Usually, two 8259 family controllers are connected serially to one another, using a standard technique called cascading, forming one functional interrupt controller 106. An Industry Standard Architecture (ISA) data bus 108 connects to both interface chip 104 and interrupt controller 106, while CPU bus 109 connects interface chip 104 to CPU 102.

When interrupt controller 106 receives an interrupt request (IRQ) signal 110 from an I/O device 111, interrupt controller 106 transmits an INTR interrupt request 112 to CPU 102. Once CPU 102 acknowledges INTR through several interrupt acknowledge signals INTA 114, interrupt controller 106 begins to generate and send the interrupt vector (corresponding to the INTR interrupt) on the DATA lines of I/O bus 108 to CPU 102 via interface chip 104. Interrupt vectors are typically 8 bits wide and provide address information for accessing stored interrupt handling routines.

Figure 1A:
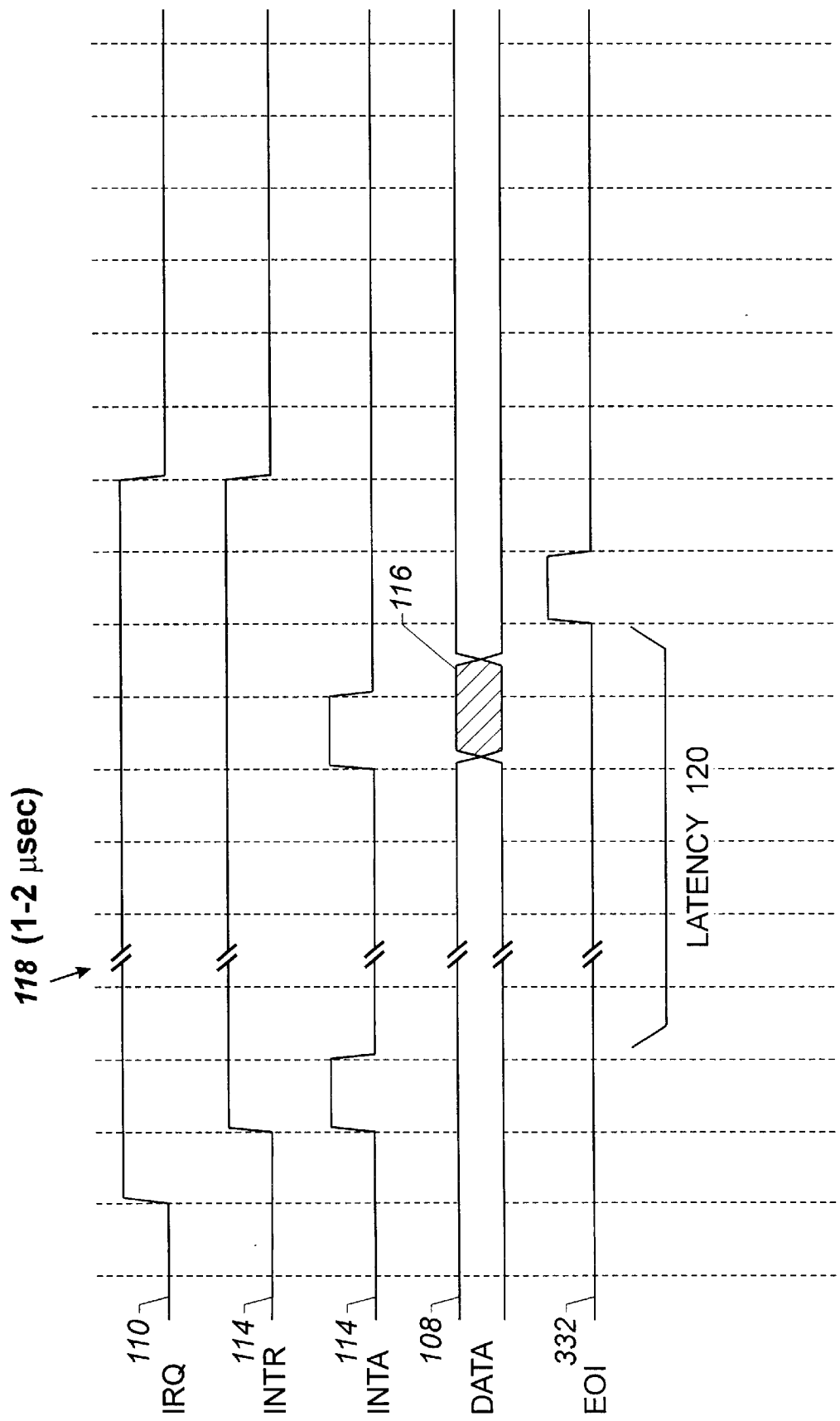
FIG. 1A is a timing diagram for the conventional hardware interrupt system.

FIG. 1A provides a timing diagram of these signals. The vertical lines represent the successive boundaries of system clock periods. Interrupt controller 106 returns valid interrupt vector data 116 during the second assertion of INTA line 114. An access time 118 of 1–2 $\mu$ sec for the I/O bus causes an acknowledge latency 120 between the first INTA acknowledge by the CPU and the receipt of valid interrupt vector 116. The End of Interrupt signal (EOI) represents an interrupt clearing signal to be decoded and interpreted by interrupt queue 204 and by interrupt controller 106. An example of a clearing signal is the End-of-Interrupt command that is sent to 8259 family interrupt controllers and that can be decoded by the circuitry of the interrupt queue. However, separate commands also can be sent to the interrupt controller and to the interrupt queue.

Referring to FIG. 2, an enhanced hardware interrupt system comprises an interrupt queue 204 connected between CPU 102 and interrupt controller 106. ISA bus 108 connects to both interrupt queue 204 and interrupt controller 106. When interrupt controller 106 receives an IRQ signal 110, interrupt request 212 (now denominated QINTR) from interrupt controller 106 routes to interrupt queue 204. A secondary interrupt request 216 (denominated PINTR) is sent by interrupt queue 204 to CPU 102 only when interrupt queue 204 has received a complete interrupt vector from interrupt controller 106.

Figure 2A:
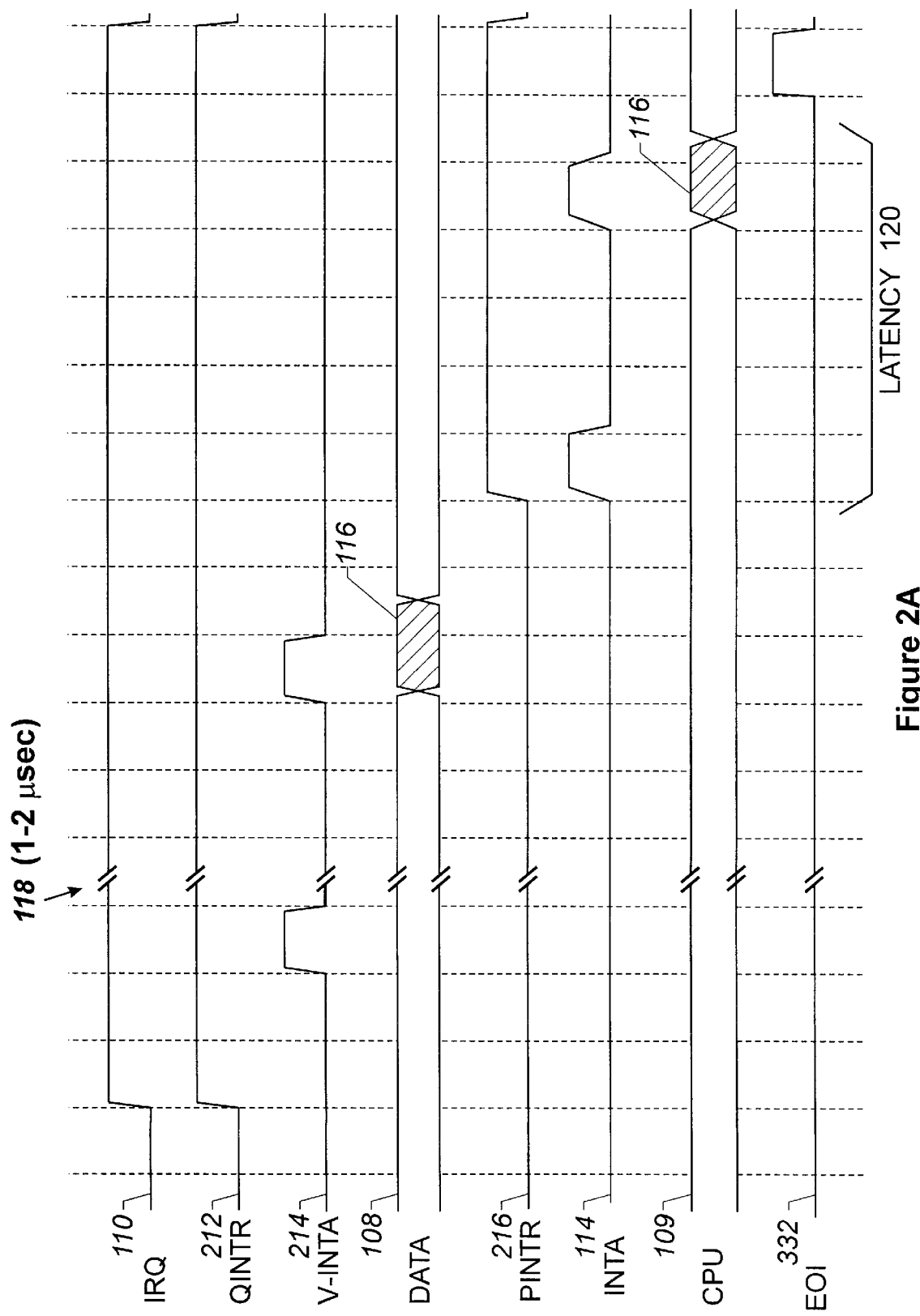
FIG. 2A is a timing diagram for the hardware interrupt system having an interrupt queue.

FIG. 2A shows a timing diagram for signals in the enhanced hardware interrupt system. After interrupt controller 106 receives an IRQ signal 110, it asserts QINTR signal 212 to interrupt queue 204. Interrupt queue 204 then asserts two virtual INTA (V-INTA) signals back to interrupt controller 106. During the second V-INTA signal and I/O access delay 118, interrupt controller 106 places valid interrupt vector 116 onto the DATA lines of data bus 108. Once interrupt queue 204 receives interrupt vector 116, it asserts the PINTR signal that then signals CPU 102 to begin a canonical interrupt acknowledge cycle uninterrupted by any access time delays. Thus, the new acknowledge latency 220 can be as low as 5 clock periods, instead of 1–2 $\mu$sec.

Figure 3:
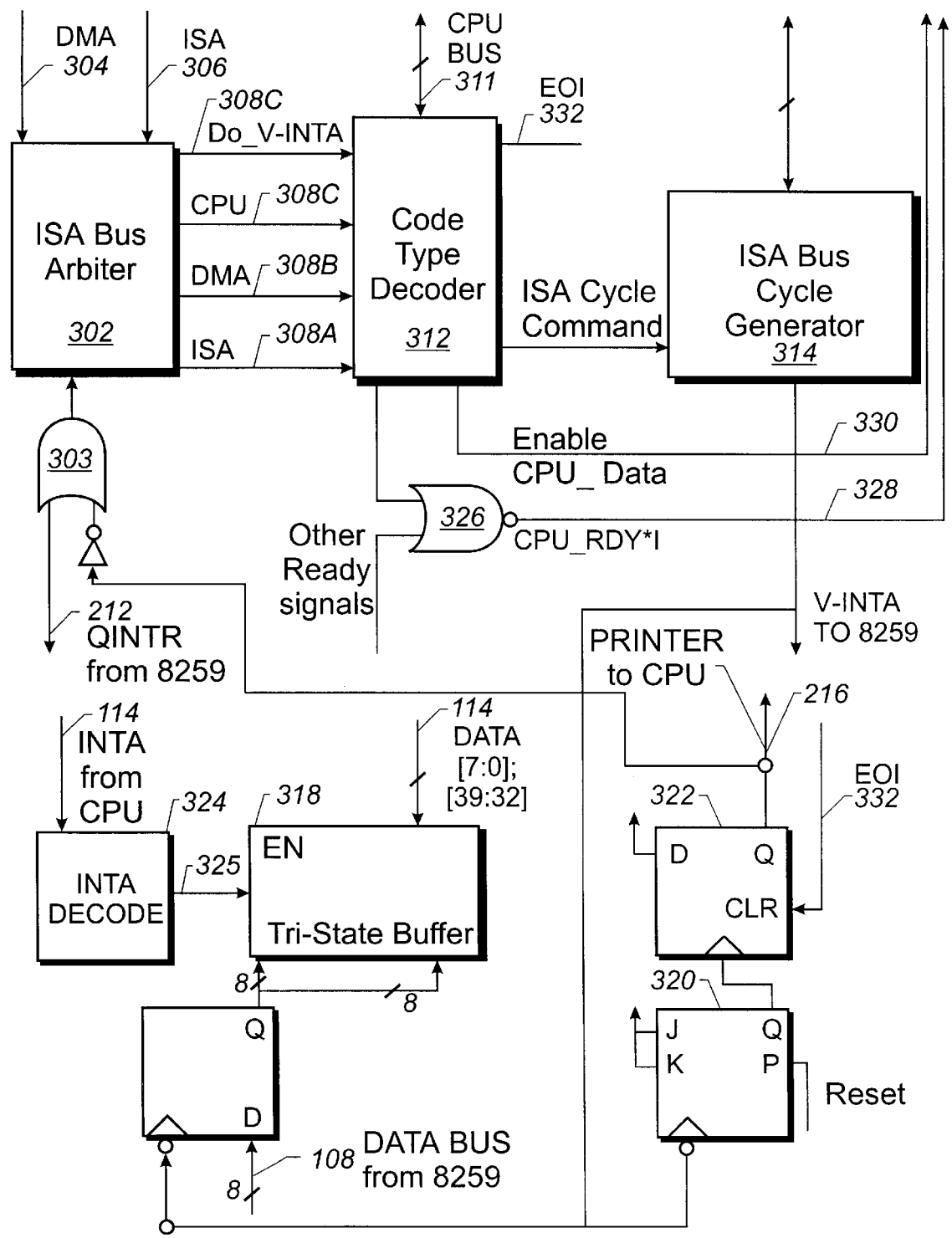
FIG. 3 is a schematic block diagram of an interrupt queue.

As shown in FIG. 3, in interrupt queue 204 an ISA bus arbiter 302 accepts a QINTR 212 interrupt signal from interrupt controller 106 ANDed with inverted CPU interrupt signal PINTR 216 (to ensure that once the CPU interrupt signal is sent, QINTR signal is ignored). The ISA Bus Arbiter then treats QINTR interrupt 212 as a bus mastership request, in the same manner as other DMA and ISA bus requests 304 and 306. (References to ISA bus arbiter 302 and ISA Bus Cycle Generator 314 can apply to their EISA, MCA and/or PCI equivalents for interrupt queues implemented in other bus architectures). ISA bus arbiter 302 then transfers the appropriate control signals (e.g., DMA, ISA, CPU Bus mastership requests 308a,b,c) as well as new DO_V_INTA request 310 to code type decoder 312, which decodes these signals and issues appropriate ISA cycle commands to ISA bus cycle generator 314. Instead of transferring interrupt QINTR 212 to CPU 102, ISA bus cycle generator generates virtual interrupt acknowledge signals V-INTA back to interrupt controller 106. During non-interrupt operations, ISA bus arbiter 302 instructs ISA bus cycle generator to generate normal CPU, ISA and DMA cycle requests. Interrupt queue 204 allows CPU bus 311 to initiate ISA accesses directly, and interrupt queue 204 creates virtual ISA interrupt acknowledge cycles (V-INTA 214) when it grants the ISA bus to the interrupt queue. V-INTA signals 214 take the place of conventional CPU INTA signals, while CPU interrupt acknowledge cycles INTA are used to enable the contents of interrupt queue register 318 onto CPU data pins 109, with a minimum number of wait states for those cycles.

When interrupt controller 106 receives two V-INTA acknowledge signals 214, interrupt controller 106 places the appropriate interrupt vector onto the lower 8 bits of data bus 108, which are then latched by latch 316 and tri-state buffer 318, connected to CPU data bus 109. (Depending on CPU requirements—with 64-bit data buses—either the lower 8 bits or bits 32–39 can require a valid data value, so tri-state buffer 318 can be configured to place the same vector in both bus locations).

Meanwhile, the trailing edge of V-INTA signal 214 clocks through flip-flop 320 and latch 322 to provide a properly timed PINTR signal 216 to CPU 102. That is, PINTR 216 will go high after two V-INTA assertions, at the same time interrupt controller 106 provides the interrupt vector to latch 316. Thereafter, CPU 102 returns an asserted interrupt acknowledge INTA to an INTA decode block 324 that controls the enable signal for tri-state buffer 318 to properly latch the buffered interrupt vector onto CPU data bus 109. Meanwhile, the inverse of active PINTR 216 will cause AND gate 303 to temporarily ignore any new interrupts QINTR 212. It is also important for the ISA arbiter (EISA, MCA or PCI arbiters in other embodiments) to ignore newly activated requests to generate V-INTA, until the QINTR deactivation latency after an EOI is met (typically <500 ns), so that spurious interrupts will not be sent to the CPU due to PINTR deactivating faster than QINTR.

INTA decode block 324 can be constructed differently for pipelined and nonpipelined CPU architectures. The following tables represent the J and K inputs, and Q outputs of flip-flops that can implement INTA decode block 324. (the CLK for each logic block is that of the CPU, "*"indicates AND operations, "+" indicates OR operations).

| Non-Pipelined J-K Flip-Flop for Non-Pipeline Processors | |
|---|---|
| Input J | ADS * not MIO * not DC * not WR |
| Input K | BRDY (+ RDY) + Reset |
| Output Q: | CPU_INTA_CYCLE 325 |

| Pipelined | |
| --- | --- |
| 1st J-K Flip-Flop for Pipelined Processors | |
| Input J | (not ADS * not MIO * not DC * not WR) * Non_Pipelined_T1 + (Early_INTA * First_T2) |
| Input K | CPU_INTA_Cycle * (BRDY (+ RDY)) + Reset |
| Output Q: | CPU INTA_CYCLE 325 |
| 2nd J-K Flip-Flop for Pipelined Processors | |
| Input J | (ADS * not MIO * not DC * not WR) * not Non_Pipelined_T1 |
| Input K | Pipelined_T1 * Early_INTA + Reset |
| Output Q: | Early_INTA |
| 3rd J-K Flip-Flop for Pipelined Processors | |
| Input J | ADS * Non_Pipelined T1 |
| Input K | NRDY * Blast + RDY + Reset |
| Output Q: | Pipelined_T1 |
| Latch for Pipelined Processors | |
| Input D | Pipelined_T1 * Not Reset + Non_Pipelined_T1 * Not Reset |
| Output Q: | First_T2 |

In both the pipelined and non-pipelined versions, the output of INTA decode block 324, CPU_INTA_Cycle 325, enables the contents of tri-state buffer 318 (the interrupt vector) onto CPU data bus 109.

Enable CPU_Data line 330 allows a data transfer by the CPU to commence. The CPU_Rdy* signal 328 is generally a low-active signal that ends a data transfer by the CPU. In some processors, this signal is CPU_Brdy*. NOR gate 326 gathers all sources of Ready signals to send one combined Ready signal to the processor.

In interrupt queue 204, the interrupt clearing signal EOI 332 clears PINTR signal 216 from latch 322, and goes active when the operating software for the CPU writes to interrupt controller 106 to clear the current interrupt. One implementation, that can be incorporated into Code Type decoder 312, is shown in logic form in the following table:

| AND Gate for EOI Signal | |
| --- | --- |
| Inputs | [(CPU_ADDR=20) + (CPU ADDR=A0)] * (CPU_BE = 0) * (CPU_Command = IO_Write) * (Pipelined_T1 + Non_Pipelined_T1 |
| Output Q: | EOI |

However, a number of other embodiments could be defined for decoding End_Of_Interrupt signals to form EOI signal 332.

Figure 4:
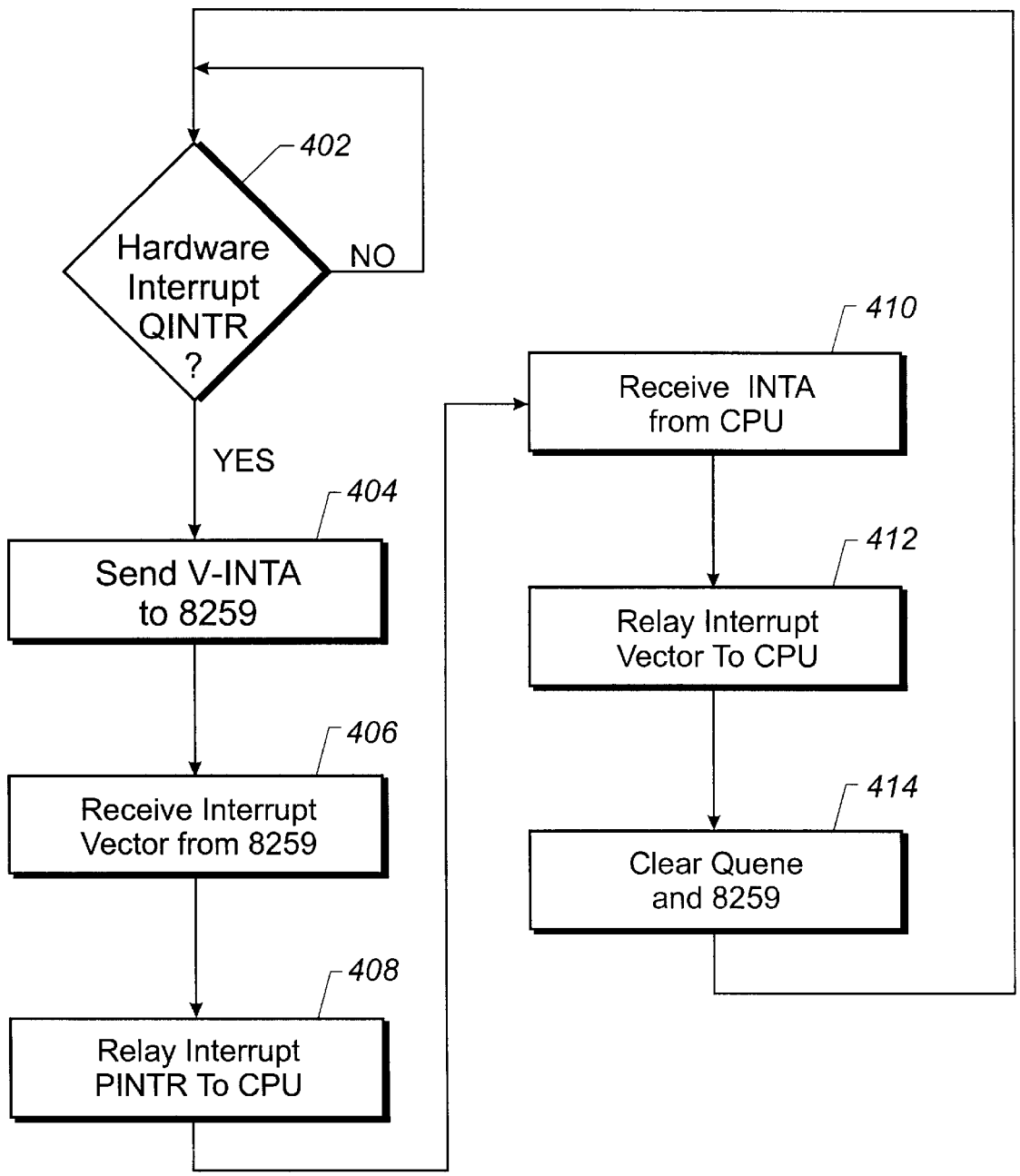
FIG. 4 is a flow chart showing the operation of the interrupt queue.

Flow chart 400 of FIG. 4 describes the sequential operation of a general interrupt queue, which can be implemented in an ISA, EISA, MCA, PCI or equivalent bus. After the bus arbiter detects 402 a hardware interrupt, it sends 404 a virtual interrupt acknowledge signal V-INTA to controller 106. Upon receipt 406 of the interrupt vector from interrupt controller 106, the interrupt queue relays 408 interrupt signal PINTR 216 to CPU 102. Then when interrupt queue 204 receives 410 normal acknowledge cycles INTA from CPU 102, it relays 412 the stored interrupt vector from tri-state buffer 318 to CPU 102. Finally, when CPU 102 writes to interrupt controller 106 to clear the interrupt, appropriate signals are generated 414 to clear the interrupt queue and the interrupt controllers. This scheme for queuing interrupts and corresponding vectors is invisible to software and interrupt controller operation, but acknowledge latency by the CPU is reduced, since CPU 102 can receive a complete interrupt vector as fast as possible after CPU 102 receives PINTR 216.

Figures 5, 6:
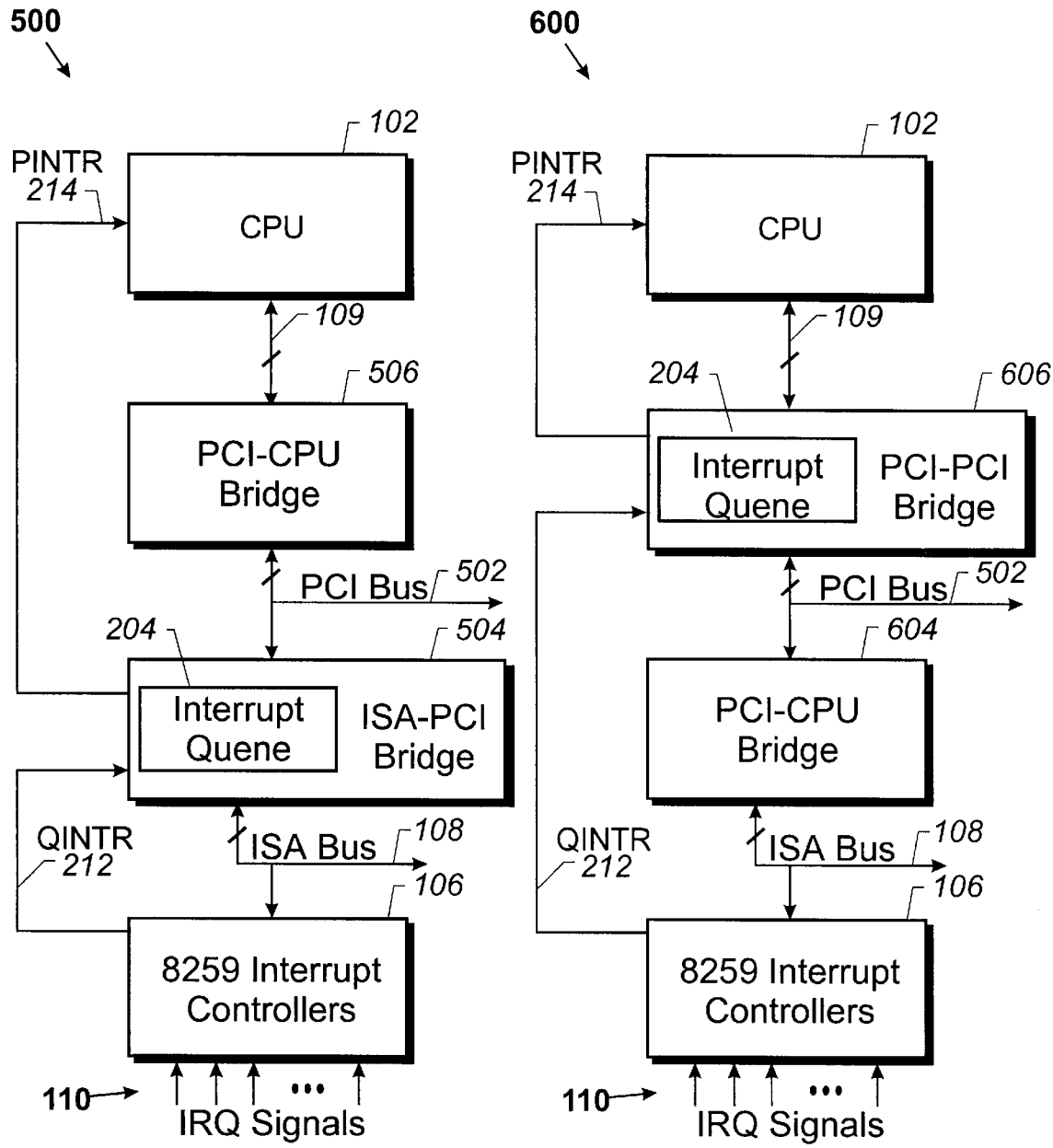
FIGS. 5 and 6 are schematic block diagrams of hardware interrupt systems for use with both ISA-like data buses and PCI data buses.

FIGS. 5 and 6 show alternative schemes, where both a conventional ISA data bus 108 and a Peripheral Component Interconnect (PCI) data bus 502 transmit information to CPU 102. In both schemes, interrupts QINTR 212 from interrupt controller 106 are sent to interrupt queue 204. In first scheme 500, the interrupt vector is sent directly to interrupt queue 204, contained within an ISA-PCI bridge interface 504, via ISA bus 108. The interrupt vector is then sent from interrupt queue 204 to the CPU via PCI-CPU bridge interface 506 (which also receives data inputs from PCI bus 502). In second scheme 600, the interrupt vector is sent to interrupt queue 204, contained in PCI-CPU bridge 606, via ISA bus 108 through ISA-PCI bridge interface 604. In addition, data lines of PCI bus 502 also connect to interrupt queue 204. Interrupts from interrupt queue 204 are then sent to CPU 102 via CPU bus 109. Where an interrupt queue 204 connects to CPU 102 through a PCI bus 502, the Reset signal for queue 204 is provided by the PCI RST# signal, which is low active. In addition, the apparatus shown in FIG. 3 can be employed in such a PCI environment by conforming all the CPU signals with their PCI equivalents.

In both alternative schemes 500 and 600, the interrupt queue can be configured to store more than one, and more than one sort of, interrupt and interrupt vector. For example, PCI architecture allows for a larger number of interrupts than ISA architecture, and also allows interrupts to be handled with greater speed. Interrupt vector register 304 can then be more than one vector deep (304a,304b, etc.) to allow for multiple interrupt handling. This allows for PCI interrupts and new device interrupts to be included in a personal computer without conflicting with ISA or EISA interrupts.

Figures 7, 8:
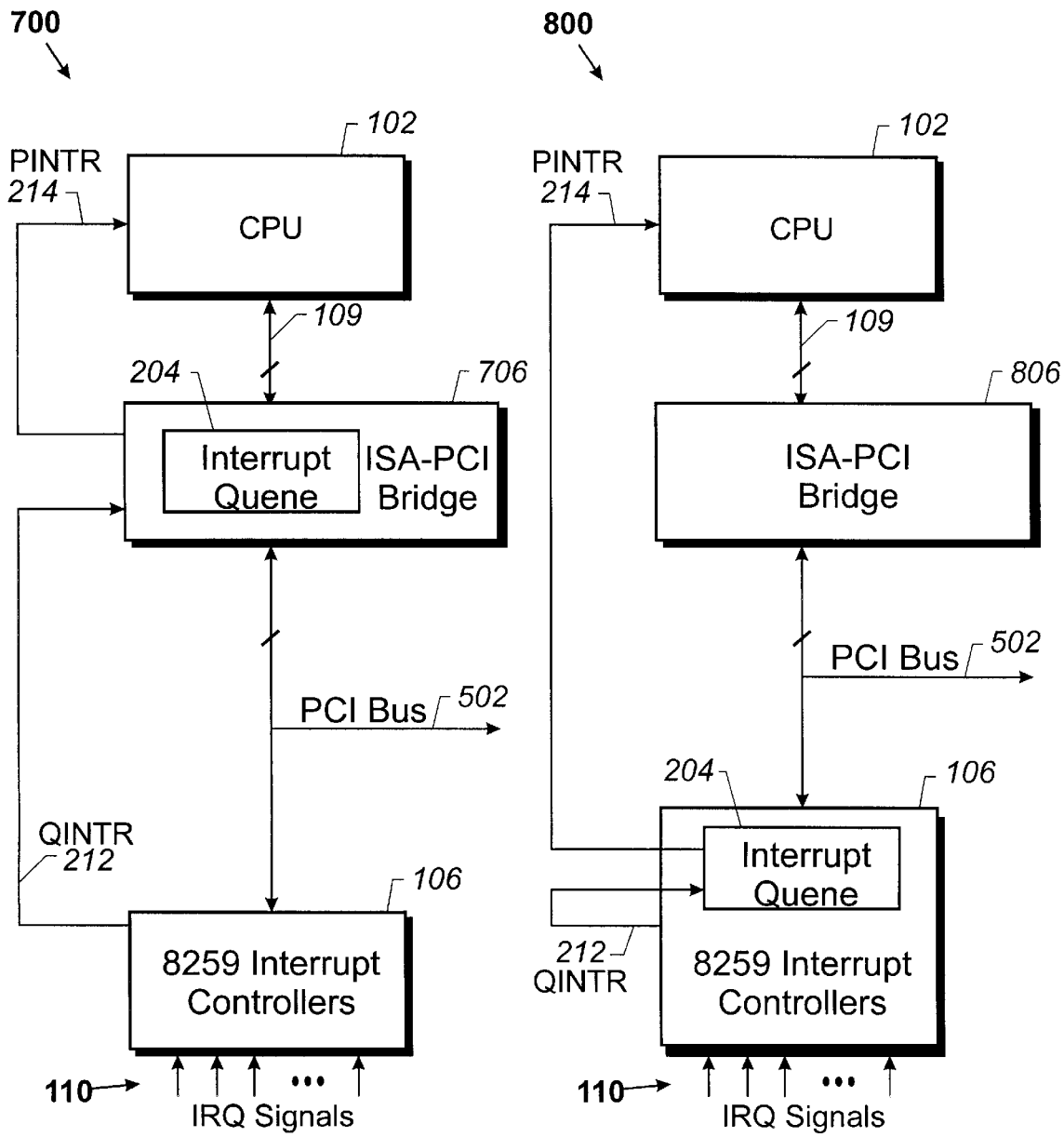
FIGS. 7 and 8 are schematic block diagrams of hardware interrupt systems for use with PCI data buses.

FIGS. 7 and 8 show further alternative schemes, where an interrupt queue 204 is incorporated into a system having only a PCI data bus 502 connect to CPU 102. Again, in these two schemes, interrupts QINTR 212 from interrupt controller 106 are sent to interrupt queue 204. Also, since PCI interrupt acknowledges have only one cycle (not two), acknowledge latency is further reduced. In scheme 700, the interrupt vector is sent to interrupt queue 204, contained in PCI-CPU bridge 606, via PCI bus 502. Interrupts from interrupt queue 204 are then sent to CPU 102 via CPU bus 109. In scheme 800, an interrupt queue 204 is incorporated directly within one or more 8259 family interrupt controllers. Otherwise, operation of scheme 800 is the same as in scheme 700.

Figure 9:
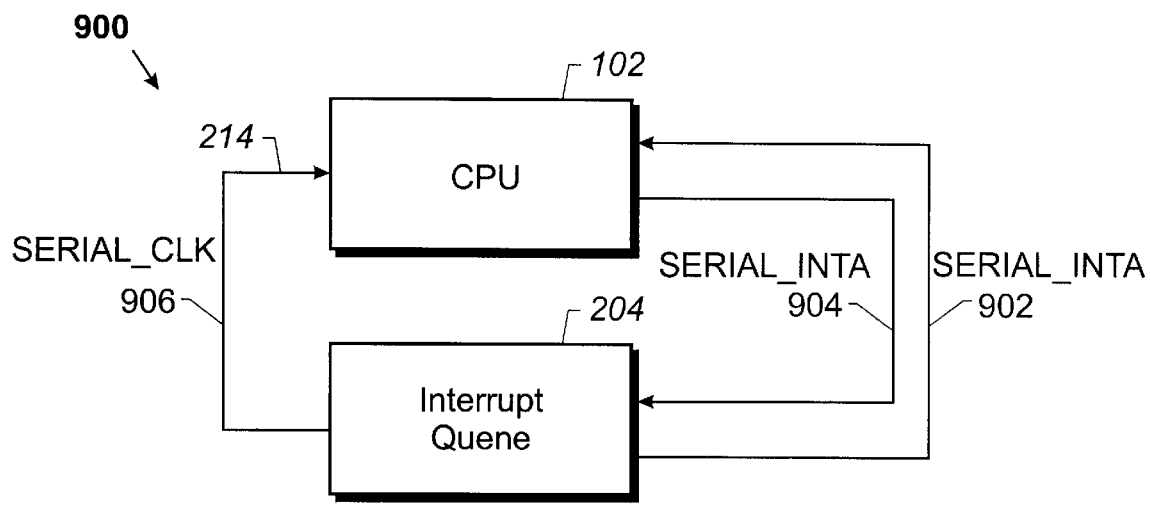
FIG. 9 is a schematic block diagram of an interrupt queue connected serially to a CPU.

Referring to FIG. 9, in another scheme, a side band interrupt delivery mechanism 900 comprises an interrupt queue 204 connected to CPU 102 in a serial fashion with three wires. To eliminate bottlenecks in CPU bus 109, interrupt queue 204 can serialize interrupt vectors. A compatible CPU 102 must have a Serial-INTR input 902 (or a mode that would use the regular INTR pin for this function), a Serial_INTA output pin 904, and a Serial_CLK input pin 906.

Figure 10:
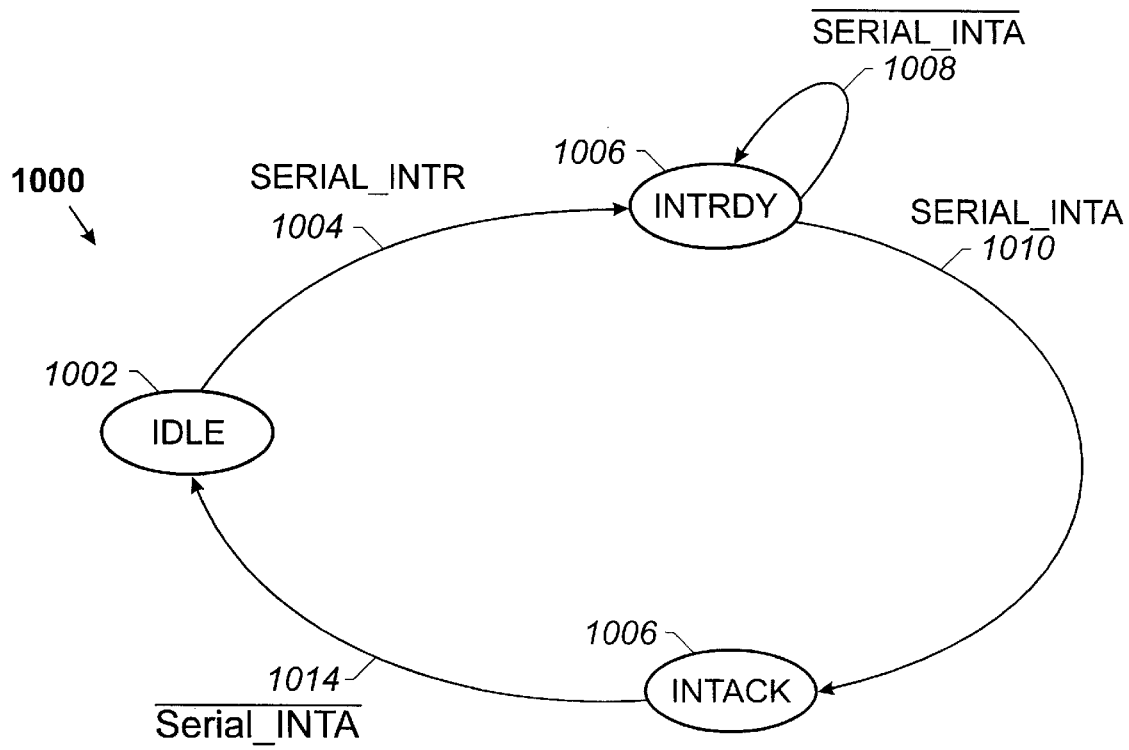
FIG. 10 is a state diagram of the serially-connected interrupt queue.

Referring to FIG. 10 (a state diagram 1000 for the side band interrupt delivery system 900), interrupt queue 204 is normally in IDLE mode 1002, keeping pin Serial_INTR 902 high (or inactive). When interrupt queue 204 asserts Serial_INTR 902 (synchronized to Serial_CLK), CPU registers an interrupt request and interrupt queue 204 changes to an interrupt ready mode INTRDY 1006. Interrupt queue 204 stays in INTRDY so long as Serial_INTA remains unasserted 1008. Once CPU 102 asserts 1010

Serial_INTA 904, interrupt queue 204 registers an interrupt acknowledge 1012 and begins to place the interrupt vector in serial form on Serial_INTR 902 for as long as Serial_INTA remains asserted (typically eight Serial_CLK 906 clocks). Once Serial_INTA goes inactive 1014, interrupt queue 204 returns to interrupt IDLE mode 1002.

Other embodiments are also within the scope of the claims. For example, the interrupt queue may be useful with other families of microprocessors and other types of buses.

What is claimed is:

1. A method for reducing the elapsed period between the time an interrupt acknowledge is issued by a CPU and the time when the corresponding interrupt vector is received at the CPU, the interrupt vector being distinct from an associated interrupt request, the interrupt acknowledge being issued by the CPU to acknowledge the interrupt request, the method comprising;
    (a) intercepting an interrupt request from a first device connected to a lower speed bus;
    (b) after the interrupt request is intercepted, temporarily storing the associated interrupt vector in a second device which is connected to a higher speed bus more closely associated with the CPU; and
    (c) storing more than one interrupt vector at a time in the second device; and
    (d) responding to the interrupt acknowledge from the CPU by delivering the temporarily stored interrupt vector to the CPU on a separate serial bus.

2. The method as claimed in claim 1 where the first device is an interrupt controller connected to an ISA, EISA or MCA, or other lower speed bus.

3. The method as claimed in claim 1 where the second device comprises a register for temporarily storing the corresponding interrupt vector.

4. The method as claimed in claim 1 further comprising sending an interrupt acknowledge from the second device to the first device.

5. The method as claimed in claim 1 further comprising sending an interrupt request from the second device to the CPU.

6. The method as claimed in claim 5 where the interrupt request is sent from the second device to the CPU only after the second device has temporarily stored the corresponding interrupt vector.

7. The method as claimed in claim 1 further comprising sending an interrupt clearing signal from the CPU to the first device and the second device.

8. The method as claimed in claim 1 where the CPU is one of the Intel 8086 family of microprocessors or a compatible equivalent.

9. The method as claimed in claim 2 where the first device is one of the Intel 8259 family of interrupt controllers or a compatible equivalent.

10. The method of claim 1, wherein the second device can temporarily store different types of interrupt vectors.

11. The method of claim 1, wherein the lower speed bus includes a PCI bus.

12. The method as claimed in claim 1, wherein the interrupt acknowledge is issued by the CPU on a separate acknowledge line.

13. A method for reducing the elapsed period between the time an interrupt acknowledge is issued by an Intel 8086 family CPU or compatible equivalent, and the time when the corresponding interrupt vector is received at the CPU, comprising:
    (a) intercepting an interrupt request from an interrupt controller connected to an ISA, EISA or MCA, or other lower speed bus;
    (b) sending an interrupt acknowledge to the interrupt controller;
    (c) temporarily storing the corresponding interrupt vector in a queue connected to a higher speed bus more closely associated with the CPU, the queue capable of storing more than one interrupt vector at a time;
    (d) sending an interrupt request to the CPU;
    (e) responding to the interrupt acknowledge from the CPU by delivering the temporarily stored interrupt vector on a separate serial bus; and
    (f) sending an interrupt clearing signal from the CPU to the interrupt controller and to the register.

14. Apparatus for reducing the elapsed period between the time an interrupt acknowledge is issued by a CPU and the time when the corresponding interrupt vector is received at the CPU, the interrupt vector being distinct from an associated interrupt request, the interrupt acknowledge being issued by the CPU to acknowledge the interrupt request, the method comprising:
    a lower speed bus;
    a serial bus;
    a first device for sending an interrupt request, the first device being connected to the lower speed bus; and
    a second device for intercepting the interrupt request and, after intercepting the interrupt request, temporarily storing in a queue the associated interrupt vector from the first device, the queue capable of storing more than one interrupt vector, the second device connected to the lower speed bus and to a higher speed bus more closely associated with the CPU, the second device being capable of responding to the interrupt acknowledge from the CPU by delivering the temporarily stored interrupt vector to the CPU on the serial bus.

15. The apparatus as claimed in claim 14 where the first device is an interrupt controller connected to an ISA, EISA or MCA, or other lower speed bus.

16. The apparatus as claimed in claim 14 where the second device comprises a register means for temporarily storing the corresponding interrupt vector.

17. The apparatus as claimed in claim 14 where the second device can send an interrupt acknowledge to the first device.

18. The apparatus as claimed in claim 14 where the second device can send an interrupt request to the CPU.

19. The apparatus as claimed in claim 18 where the second device sends the interrupt request to the CPU only after the second device has temporarily stored the corresponding interrupt vector.

20. The apparatus as claimed in claim 14 where the first device and the second device can receive an interrupt clearing signal from the CPU.

21. The apparatus as claimed in claim 14 where the CPU is one of the Intel 8086 family of microprocessors or a compatible equivalent.

22. The apparatus as claimed in claim 15 where the first device is one of the Intel 8259 family of interrupt controllers or a compatible equivalent.

23. The apparatus as claimed in claim 14, further comprising a separate acknowledge line connected between the CPU and the interrupt queue, the interrupt queue providing the interrupt vector to the CPU in response to activation of the acknowledge line.

24. The apparatus of claim 14, wherein the second device can temporarily store different types of interrupt vectors.

25. The apparatus of claim 14, wherein the lower speed bus included a PCI bus.

26. Apparatus for reducing the elapsed period between the time an interrupt acknowledge is issued by a CPU and the time when the corresponding interrupt vector is received at the CPU, comprising:

a lower speed bus;

a serial bus;

an interrupt controller connected to the lower speed bus for issuing interrupt requests; and an interrupt queue connected to the lower speed bus and to a higher speed bus more closely associated with the CPU for receiving the interrupt requests, the interrupt queue capable of storing more than one interrupt vector corresponding to the interrupt requests, the interrupt queue delivering an interrupt vector to the CPU in response to an interrupt acknowledge on the serial bus.

27. The apparatus as claimed in claim 26 where the interrupt queue is capable of intercepting the interrupt request and storing the corresponding interrupt vector from the interrupt controller, and where the interrupt queue is capable of responding to the interrupt acknowledge from the CPU by delivering the temporarily stored interrupt vector on the serial bus.

28. The apparatus as claimed in claim 26 where the interrupt controller is connected to an ISA, EISA or MCA, or other lower speed bus.

29. The apparatus as claimed in claim 26 where the interrupt queue further comprises a register for temporarily storing the corresponding interrupt vector.

30. The apparatus as claimed in claim 26 where the interrupt queue can send an interrupt acknowledge to the interrupt controller.

31. The apparatus as claimed in claim 26 where the interrupt queue can send an interrupt request to the CPU.

32. The apparatus as claimed in claim 31 where the interrupt queue sends the interrupt request to the CPU only after the interrupt queue has temporarily stored the corresponding interrupt vector.

33. The apparatus as claimed in claim 26 where the interrupt controller and the interrupt queue can receive an interrupt clearing signal from the CPU.

34. The apparatus as claimed in claim 26 where the CPU is one of the Intel 8086 family of microprocessors or a compatible equivalent.

35. The apparatus as claimed in claim 28 where the interrupt controller is one of the Intel 8259 family of interrupt controllers or a compatible equivalent.

36. The apparatus of claim 26, wherein the interrupt queue is capable of storing more than one type of interrupt request.

37. The apparatus of claim 26, wherein the lower speed bus include a PCI bus.

38. Apparatus for reducing the elapsed period between the time an interrupt acknowledge is issued by a CPU and the time when the corresponding interrupt vector is received at the CPU, comprising:

lower speed buses;

a serial bus; and an interrupt queue connected to a higher speed bus more closely associated with the CPU for intercepting interrupt requests from the lower speed buses, the interrupt queue capable of storing multiple interrupt vectors corresponding to but separate from the interrupt requests, the interrupt queue responsive to an interrupt acknowledge from the CPU by delivering a stored interrupt vector on the serial bus.

39. The apparatus of claim 38, wherein the lower speed buses include a PCI bus.

40. Apparatus for reducing the elapsed period between the time an interrupt acknowledge is issued by a CPU and the time when the corresponding interrupt vector is received at the CPU, comprising:

a lower speed bus;

an interrupt controller connected to the lower speed bus for issuing an interrupt request;

an interrupt queue connected to the lower speed bus and to a higher speed bus more closely associated with the CPU for receiving the interrupt request, the interrupt queue storing the interrupt vector corresponding to the interrupt request; and a serial line connecting the interrupt queue and the CPU over which the interrupt queue delivers an interrupt vector to the CPU in response to an interrupt acknowledge.

41. The apparatus of claim 40, wherein the serial line is connected to a serial interrupt input pin of the CPU.

42. The apparatus of claim 40, wherein the lower speed bus includes an ISA, EISA or MCA, or other lower speed bus.

43. The apparatus as claimed in claim 40, further comprising an acknowledge line connected between the CPU and the interrupt queue, the interrupt queue providing the interrupt vector to the CPU in response to activation of the acknowledge line.

* * * * *